United States Patent [19]
Kim

[11] Patent Number: 5,858,116
[45] Date of Patent: Jan. 12, 1999

[54] BOWL CLEANSING DEVICE HAVING FRUIT AND VEGETABLE CLEANSING MODE AND FRUIT AND VEGETABLE CLEANSING METHOD USING THE SAME

[75] Inventor: Sinyong Kim, Suwon, Rep. of Korea

[73] Assignee: Samsung Electronics Co., Ltd., Suwon, Rep. of Korea

[21] Appl. No.: 974,425

[22] Filed: Nov. 19, 1997

[30] Foreign Application Priority Data

Nov. 19, 1996 [KR] Rep. of Korea ...................... 96-55478

[51] Int. Cl.$^6$ ............................................ B08B 3/02
[52] U.S. Cl. ........................ 134/253; 134/25.1; 134/25.2; 134/26; 134/18; 134/30; 134/57 D; 134/58 D; 134/105; 134/113
[58] Field of Search ................................. 134/25.1, 25.2, 134/25.3, 26, 18, 30, 56 R, 57 D, 57 DL, 56 D, 58 D, 58 DL, 94.1, 99.1, 103.2, 103.3, 105, 113, 108

[56] References Cited

U.S. PATENT DOCUMENTS

| | | | |
|---|---|---|---|
| 2,725,062 | 11/1955 | Vile | 134/25.3 |
| 3,041,212 | 6/1962 | Booth | 134/25.3 |
| 4,159,211 | 6/1979 | Hoffman et al. | 134/108 |
| 4,768,534 | 9/1988 | Anderson | 134/175 |
| 5,020,555 | 6/1991 | Hishibayashi | 134/65 |
| 5,419,353 | 5/1995 | Chen | 134/102.1 |
| 5,451,266 | 9/1995 | Kirk et al. | 134/25.2 |
| 5,601,100 | 2/1997 | Kawakami et al. | 134/56 R |

*Primary Examiner*—Jill Warden
*Assistant Examiner*—Sharidan Carrillo
*Attorney, Agent, or Firm*—Burns, Doane, Swecker & Mathis, L.L.P.

[57] ABSTRACT

A bowl cleansing device and a fruit and vegetable cleansing method using the same are provided. The bowl cleansing device comprising: a cabinet for forming a cleansing room; a cleansing basket installed inside the cleansing room, for loading therein articles to be cleansed; a spray nozzle for spraying the cleansing water to the articles loaded in the cleansing basket; a pump for supplying the cleansing water to the spray nozzle; a heater for heating the cleansing water; a mode selector for selecting one of a plurality of modes including a bowl cleansing mode and a fruit and vegetable cleansing mode; and a controller for controlling the heater so that the cleansing water has a temperature suitable for the cleansing mode selected through the mode selector. The bowl cleansing device may further comprise: a temperature sensor for detecting the temperature of the cleansing water, wherein the controller controls the heater according to the detected temperature of the cleaning water; and a pollution sensor for detecting the pollution level of the cleansing water, wherein if the detected pollution level is below a preset reference value after a cleansing operation, the controller determines that the cleansing operation is completed and stops the cleansing operation. Accordingly, the fruit and vegetable cleansing operation and the bowl cleansing operation can be selectively performed, as necessary.

9 Claims, 3 Drawing Sheets

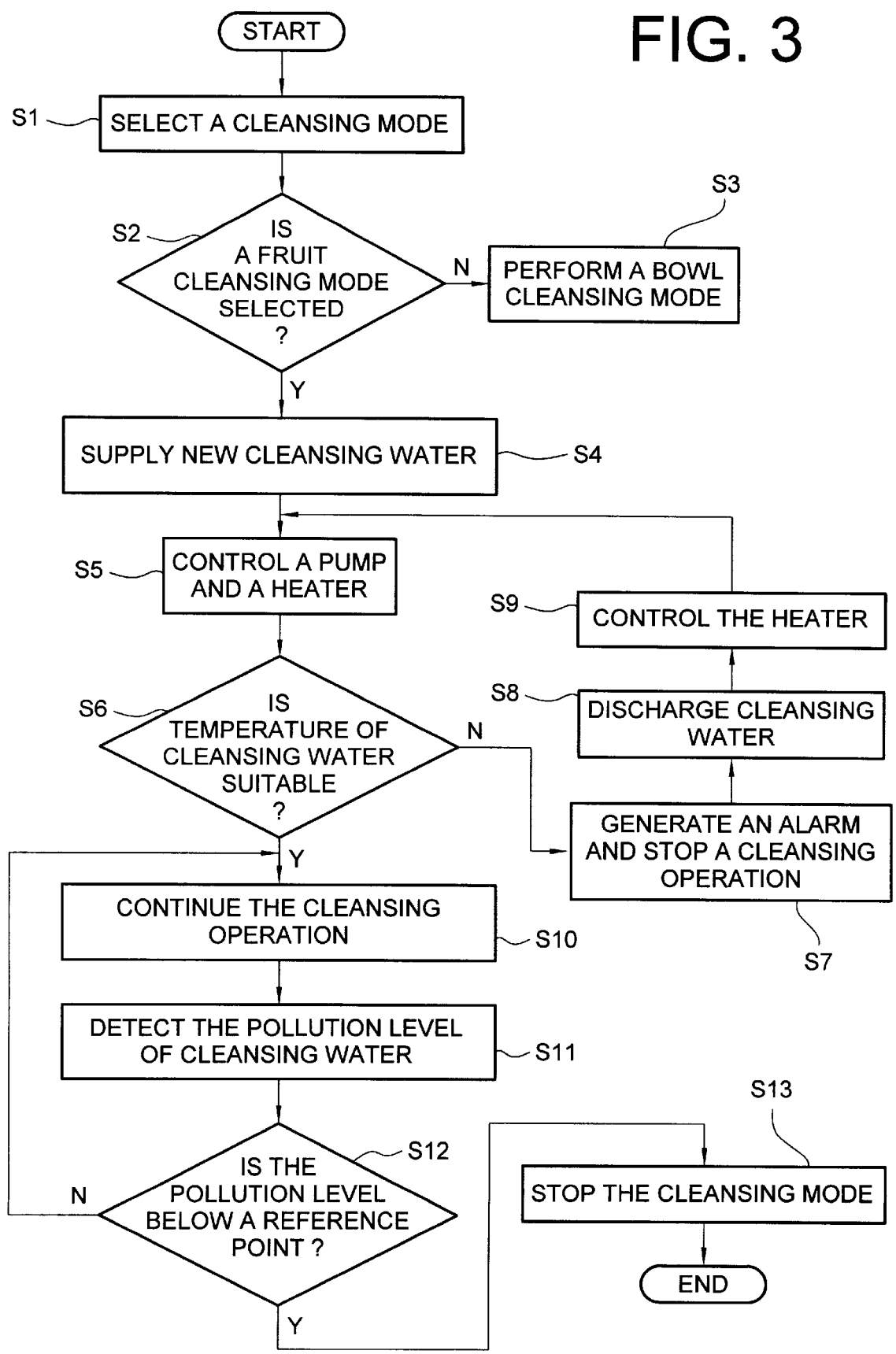

BOWL CLEANSING DEVICE HAVING FRUIT AND VEGETABLE CLEANSING MODE AND FRUIT AND VEGETABLE CLEANSING METHOD USING THE SAME

BACKGROUND OF THE INVENTION

The present invention relates to a bowl cleansing device and a fruit cleansing method using the same.

A conventional bowl cleansing device includes a cleansing room for containing a basket in which bowls to be cleansed are loaded, a spray nozzle for spraying cleansing water to the basket in the cleansing room and a pump for supplying the cleansing water to the spray nozzle. A heater for heating the cleansing water is installed under the cleansing room to increase a cleansing efficiency.

The conventional bowl cleansing device has only one use of cleansing bowls. It is, therefore, desirable to extend the use of the bowl cleansing device to cleansing of different articles such as fruits or vegetables. However, since hot cleansing water is used for the bowl cleansing operation in the conventional cleansing device, nutritive elements, flavor and freshness of fruits or vegetables may be damaged due to the hot cleansing water.

SUMMARY OF THE INVENTION

It is an object of the present invention to provide a bowl cleansing device which is capable of cleansing fruits and a fruit cleansing method using the same.

To accomplish the above object, there is provided a bowl cleansing device comprising:
  a cabinet for forming a cleansing room;
  a cleansing basket installed inside the cleaning room, for loading therein articles to be cleansed;
  a spray nozzle for spraying the cleansing water to the articles loaded in the cleansing basket;
  a pump for supplying the cleansing water to the spray nozzle;
  a heater to heating the cleansing water;
  a mode selector for selecting one of a plurality of modes including a bowl cleansing mode and a fruit cleansing mode; and
  a controller for controlling the heater so that the cleansing water has a temperature suitable for the cleansing mode selected through the mode selector.

The bowl cleansing device may further comprise: a temperature sensor for detecting the temperature of the cleansing water, wherein the controller controls the heater according to the detected temperature of the cleansing water;
  an alarm device for generating an alarm when the detected temperature of the cleansing water is out of a preset admissible range with respect to the selected mode; and
  a pollution sensor for detecting the pollution level of the cleansing water, wherein if the detected pollution level is below a preset reference value after a cleansing operation, the controller determines that the cleansing operation is completed and stops the cleansing operations.

Here, if the fruit cleansing mode is selected, the heater may not operate so that cold cleansing water is supplied to the spray nozzle.

To accomplish the above object, there is also provided a fruit cleansing method using a bowl cleansing device including: a cabinet for forming a cleansing room; a cleansing basket installed inside the cleansing room, for loading therein articles to be cleansed; a spray nozzle for spraying the cleansing water to the articles loaded in the cleansing basket; a pump for supplying the cleansing water to the spray nozzle; and a heater for heating the cleansing water; and a mode selector for selecting one of a plurality of modes including a bowl cleansing mode and a fruit cleansing mode, comprising the steps of:
  selecting the fruit cleansing mode through the mode selector;
  controlling the heater so that the cleansing water is within a preset temperature range corresponding to the fruit cleansing mode.

The fruit cleansing method may further comprise the step of detecting the temperature of the cleansing water, wherein the heater is controlled according to the detected temperature.

Here, the heater may not operate so that cold cleansing water is supplied to the basket, in the selected fruit cleansing mode.

BRIEF DESCRIPTION OF THE DRAWINGS

The above object and advantage of the present invention will become apparent by describing in detail a preferred embodiment thereof with reference to the accompanying drawings in which:

FIG. 3 shows a flow diagram for explaining a fruit cleansing method according to the present invention.

DETAILED DESCRIPTION OF THE INVENTION

Figure 1:
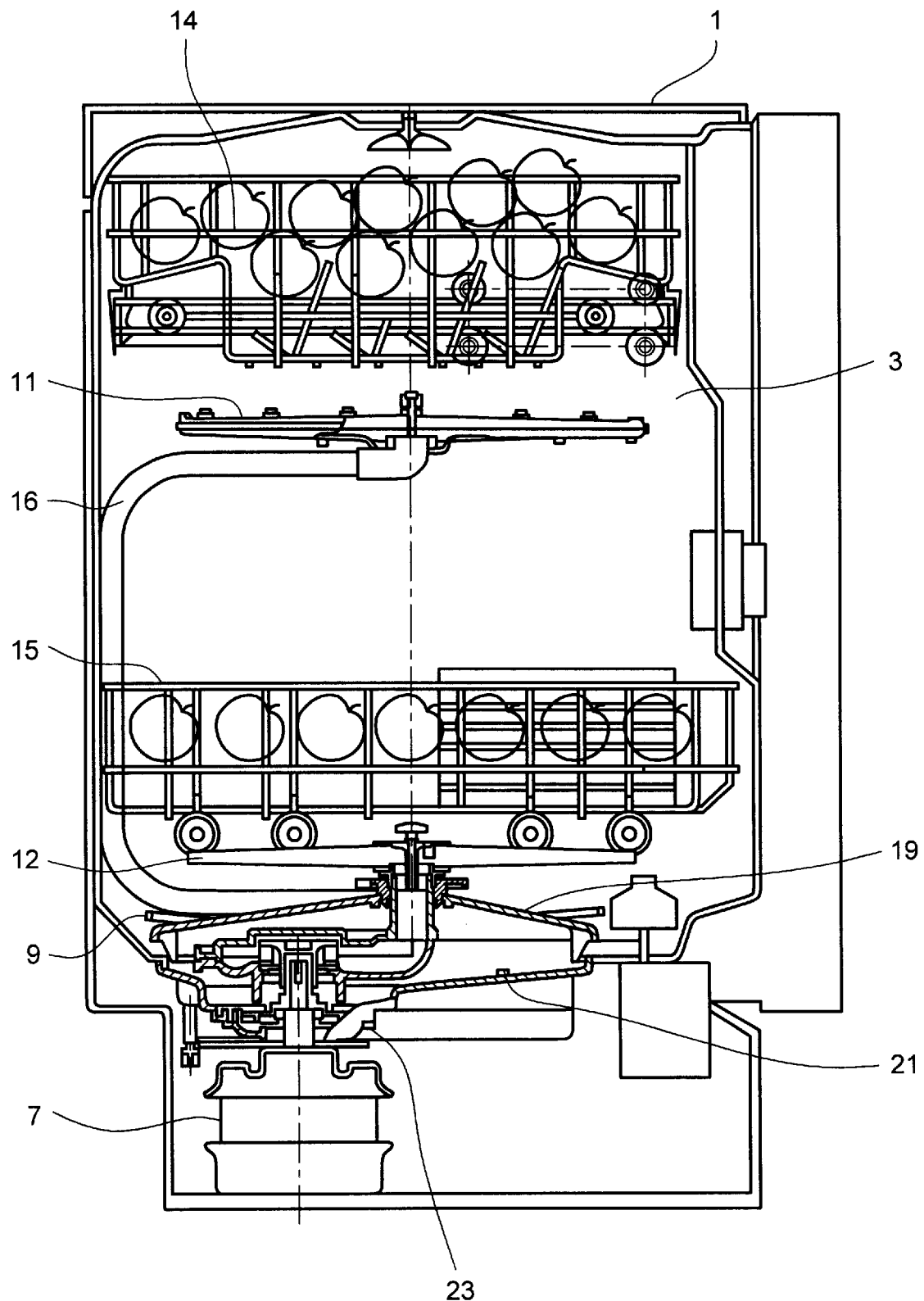
FIG. 1 schematically shows a section of a bowl cleansing device according to the present invention.

Referring to FIG. 1, a bowl cleansing device according to the present invention includes a cabinet 1 forming a cleansing room 3, a pair of baskets 14 and 15 each installed at upper and lower portions of the cleansing room 3 for loading therein articles to be cleansed, for example, bowls or fruits and a pair of spray nozzles 11 and 12 installed under the respective baskets 14 and 15.

The front of the cleaning room 3 is provided with a door 5 for opening and closing the cleansing room 3. A water container 19 for storing cleansing water is installed at the bottom of the cleansing room 3. The water container 19 is provided with an inlet valve device (39 in FIG. 2) through which the cleansing water is supplied from the outside to the water container 19 and an outlet valve device (41 in FIG. 2) through which the cleansing water in the water container 19 is discharged to the outside. A pump 7 is installed under the water container 19 to supply the cleansing water in the water container 19 to the respective nozzles 11 and 12. A heater 9 is installed in the vicinity of the water container 19 to control the temperature of the cleansing water in the water container 19.

Part of the cleansing water pumped up by the pump 7 is supplied to the lower nozzle 12 and the remaining part thereof is supplied to the upper nozzle 11 through a feeding pipe 16 which is installed between the upper and lower nozzles 11 and 12. The nozzles 11 and 12 rotate by a pressure of the supplied cleansing water without a separate driver and spray the cleansing water to the baskets 14 and 15 through a multiplicity of spray holes formed thereon.

A temperature sensor 21 for detecting the temperature of the cleansing water in the water container 19 and a pollution sensor 23 for detecting the pollution level of the cleansing water in the water container 19 are installed at the bottom of the water container 19, respectively.

Figure 2:
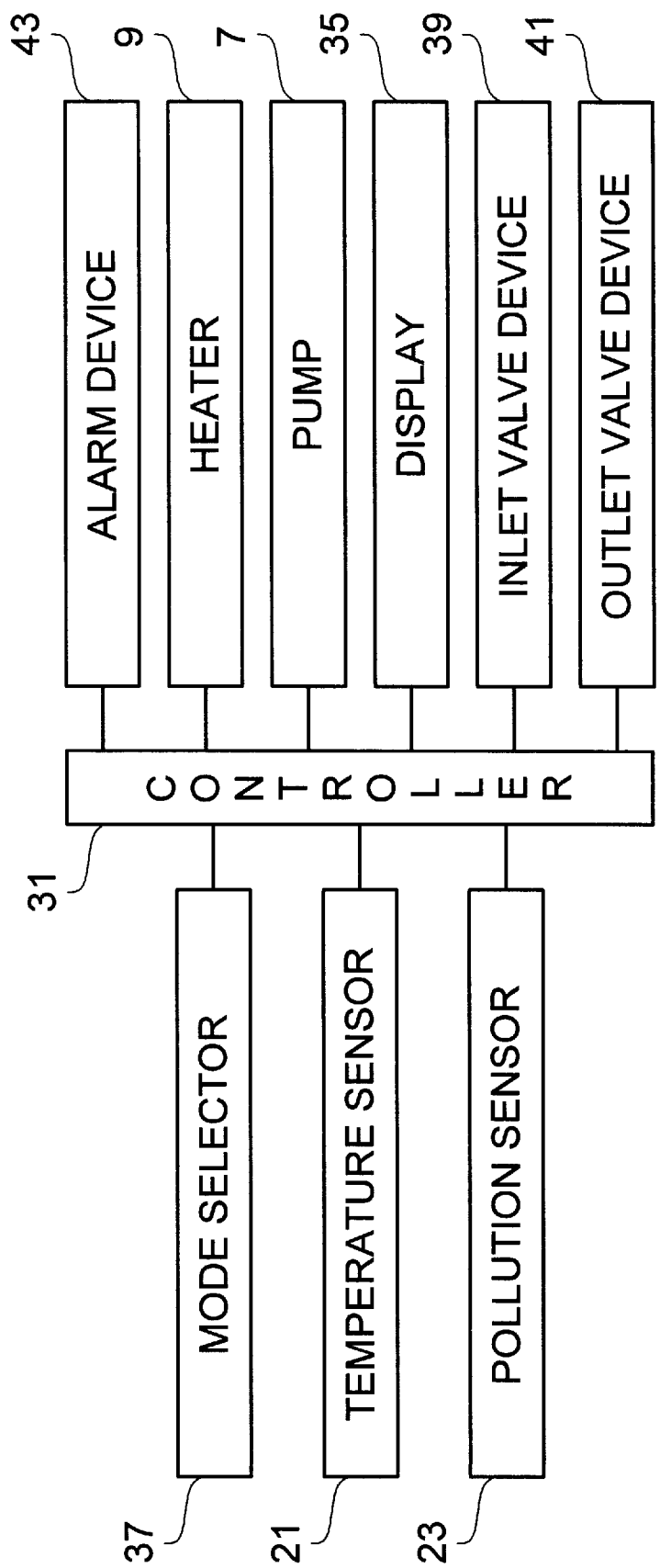
FIG. 2 shows a control block diagram for the bowl cleansing device according to the present invention.

As shown in FIG. 2, the bowl cleansing device according to the present invention further includes a mode selector 38 for selecting one of a bowl cleansing mode and a fruit cleansing mode according to manipulation of a user and a controller 31 for controlling the pump 7, the heater 9, the inlet valve device 39 and the outlet valve device 41 according to a control program stored therein, corresponding to a selected mode, to make the bowl cleansing device perform a cleansing operation. The bowl cleansing device may have a cleansing mode different from the bowl and fruit cleansing modes, as necessary.

The temperature sensor 21 detects the temperature of the cleansing water in the water container 19 and transmits a temperature signal to the controller 31. When the temperature of the cleansing water in the water container 19 is out of a preset temperature range in any selected mode, the controller 31 generates an alarm through an alarm device 43 and at the same time stops the cleansing operation. Then, the controller 31 controls the outlet valve device 41 to discharge the cleansing water from the water container 19 to the outside and controls the heater 9, the pump 7 and the inlet valve device 39 to supply new cleansing water to the water container 19 so that the cleansing water in the water container 19 has a suitable temperature. When the temperature of the cleansing water in the water container 19 is within the preset range in the selected mode, the cleansing operation continues according to control of the selected mode, the cleansing operation continues according to control of the controller 31.

Meanwhile, the pollution sensor 23 detects the pollution level of the cleansing water in the water container 19 and transmits a pollution level signal to the controller 31. The controller 31 determines whether the cleansing water in the water container 19 should be discharged or not, according to the pollution level signal. The pollution sensor 23 includes a light emitting element (not shown) and a light receiving element (not shown) which are disposed opposite to each other in the water container 19 and detects the pollution level of the cleansing water according to the amount of light which reaches the light receiving element from the light emitting element.

The controller 31 also displays information such as a selected cleansing mode or other operating conditions through a display 35.

A fruit cleansing method according to the present invention will be described hereinafter with reference to FIG. 3.

Firstly, the user selects a cleansing mode through the mode selector 37 (step S1) and the controller 31 confirms whether the selected mode is the fruit cleansing mode or the bowl cleansing mode (step S2). If the bowl cleansing mode is selected, the bowl cleansing operation is performed according to the control program (step S3). If the fruit cleansing mode is selected, new cleansing water is supplied to the water container 19 from the outside through the inlet valve device 39 (step S4). Then, the controller 31 controls the heater 9 so that the temperature of the cleansing water in the water container 19 becomes suitable and controls the pump 7 to supply the cleansing water having the suitable temperature to the spray nozzles 11 and 12 (step S5). At this time, the control of the temperature of the cleansing water is performed by controlling current applied to the heater 9. As necessary, the heater 9 may operate intermittently or stop so as to supply cold cleansing water.

In order to determine the operation of the heater 9, the temperature sensor 21 detects the temperature of the cleansing water and the controller conforms whether the temperature of the cleansing water is suitable (step S6). If the temperature of the cleansing water exceeds the suitable temperature, the controller 31 generates an alarm through the alarm device 43 and stops the cleansing operation so that the cleansing water having the exceeded temperature is not supplied to fruits to be cleansed (step S7). Then, the cleansing water having the exceeded temperature is discharged through the outlet valve device 41 to the outside and new cleansing water is supplied to the water container 19 through the processes as in the steps S4 and S5. If the temperature of the cleansing water is or becomes suitable, the cleansing operation continues.

The fruit cleansing method includes a rinsing process. In the rinsing process, the pollution sensor 23 detects the pollution level of the cleansing water (step S11). Then, the controller 31 confirms whether the detected pollution level is below a reference value (step S12). If the detected pollution level is below the reference value, it is determined that the cleansing operation is completed and accordingly the cleansing operation stops (step S13). If not, the polluted cleansing water is discharged and new cleansing water is supplied to control the pollution level, and the cleansing operation continues.

As described above, according to the bowl cleansing device and the fruit cleansing method of the present invention, the fruit cleansing operation and the bowl cleansing operation can be selectively performed, as necessary.

What is claimed is:

1. A bowl cleansing device comprising:

a cabinet for forming a cleansing room;

a cleansing basket installed inside said cleansing room, for loading therein articles to be cleansed; a source of cleansing water for supplying cleansing water to said cleansing room;

a spray nozzle disposed inside said cleansing room for spraying said cleansing water to the articles loaded in said cleansing basket;

a pump in communication with said source of cleansing water for supplying the cleansing water to said spray nozzle;

a heater in communication with said source of cleansing water for heating the cleansing water;

a mode selector for selecting one of a plurality of modes including a bowl cleansing mode and a fruit and vegetable cleansing mode; and a controller for controlling said heater so that the cleansing water has a temperature suitable for the cleansing mode selected through said mode selector.

2. The bowl cleansing device as claimed in claim 1, further comprising a temperature sensor for detecting the temperature of the cleansing water, wherein said controller controls said heater according to the detected temperature of the cleansing water.

3. The bowl cleansing device as claimed in claim 2, further comprising an alarm device for generating an alarm when the detected temperature of the cleansing water is out of a preset admissible range with respect to the selected mode.

4. The bowl cleansing device as claimed in claim 1, wherein if the fruit and vegetable cleansing mode is selected, said heater does not operate so that cold cleansing water is supplied to said spray nozzle.

5. The bowl cleansing device as claimed in claim 1, wherein said source of cleansing water comprises a water container disposed inside said cleansing room for storing said cleansing water therein.

6. The bowl cleansing device as claimed in claim 5, further comprising a pollution sensor for detecting a pollution level of the cleansing water in said water container, wherein if the detected pollution level is below a preset reference value after a cleansing operation, said controller determines that the cleansing operation is completed and stops the cleansing operation.

7. A fruit and vegetable cleansing method using a bowl cleansing device including: a cabinet for forming a cleansing room; a cleansing basket installed inside said cleansing room, for loading therein fruits and vegetables to be cleansed; a spray nozzle for spraying cleansing water to said fruits and vegetables loaded in said cleansing basket; a pump for supplying the cleansing water to said spray nozzle; a heater for heating the cleansing water, and a mode selector for selecting one of a plurality of modes including a bowl cleansing mode and a fruit and vegetable cleansing mode, comprising the steps of:

loading fruits and vegetables into said cleansing basket;

selecting the fruit and vegetable cleansing mode through said mode selector;

controlling said heater so that the cleansing water is within a preset temperature range corresponding to the fruit and vegetable cleansing mode; and cleaning said fruits and vegetables by spraying said cleansing water from said spray nozzle.

8. The fruit and vegetable cleansing method as claimed in claim 7, further comprising the step of detecting a temperature of the cleansing water, wherein said heater is controlled according to the detected temperature.

9. The fruit and vegetable cleansing method as claimed in claim 7, wherein said heater does not operate so that cold cleansing water is supplied to said basket, in the selected fruit and vegetable cleansing mode.

* * * * *